United States Patent
Acuna Rougier et al.

(10) Patent No.: US 12,509,607 B2
(45) Date of Patent: Dec. 30, 2025

(54) METHOD FOR OBTAINING WATER-BASED PAINTS USING EXPANDED POLYSTYRENE (EPS) WASTE AND/OR EXTRUDED POLYSTYRENE (XPS) WASTE AS RAW MATERIAL

(71) Applicants: Cristina Lucía Acuna Rougier, Santiago (CL); Constanza Catalina de Lourdes Cifuentes Eaglehurst, Santiago (CL)

(72) Inventors: Cristina Lucía Acuna Rougier, Santiago (CL); Constanza Catalina de Lourdes Cifuentes Eaglehurst, Santiago (CL)

( * ) Notice: Subject to any disclaimer, the term of this patent is extended or adjusted under 35 U.S.C. 154(b) by 703 days.

(21) Appl. No.: 17/904,603

(22) PCT Filed: Apr. 23, 2021

(86) PCT No.: PCT/CL2021/050031
§ 371 (c)(1),
(2) Date: Aug. 19, 2022

(87) PCT Pub. No.: WO2021/212247
PCT Pub. Date: Oct. 28, 2021

(65) Prior Publication Data
US 2023/0159784 A1   May 25, 2023

Related U.S. Application Data

(60) Provisional application No. 63/014,305, filed on Apr. 23, 2020.

(51) Int. Cl.
| | |
|---|---|
| C08J 11/08 | (2006.01) |
| C09D 5/02 | (2006.01) |
| C09D 7/45 | (2018.01) |
| C09D 7/61 | (2018.01) |
| C09D 7/65 | (2018.01) |
| C09D 125/06 | (2006.01) |

(52) U.S. Cl.
CPC .......... *C09D 125/06* (2013.01); *C08J 11/08* (2013.01); *C09D 5/022* (2013.01); *C09D 7/45* (2018.01); *C09D 7/61* (2018.01); *C09D 7/65* (2018.01); *C08J 2325/06* (2013.01)

(58) Field of Classification Search
USPC .......................................................... 521/47
See application file for complete search history.

(56) References Cited

FOREIGN PATENT DOCUMENTS

| CN | 1163914 A | 11/1997 | |
|---|---|---|---|
| CN | 104263101 A | 1/2015 | |
| CN | 104693857 A * | 6/2015 | |
| CN | 108178941 A | 6/2018 | |
| CN | 108300235 A * | 7/2018 | .......... C09D 125/14 |
| WO | 2018027755 A1 | 2/2018 | |

OTHER PUBLICATIONS

Acevedo Perez R et al. Estudio para la elaboracion de emulsiones a partir de poliestireno expandido post-consumo (2013)Tesis Universidad industrial de Santander | Rucaramangca Machine Translation (Year: 2013).*
CN104693857A Machine Translation (Year: 2015).*
CN-108300235-A Machine translation (Year: 2018).*
Acevedo Perez et al., "Estudio para la elaboracion de emulsiones a partir de poliestireno expandido post-consumo (2013) Tesis Universidad Industrial de Santander Bucaramanga", 2013, pp. 1-60.
International Search Report for Corresponding International Application No. PCT/CL2021/050031, 3 pages, Jul. 15, 2021.

* cited by examiner

*Primary Examiner* — Terressa Boykin
(74) *Attorney, Agent, or Firm* — LUCAS & MERCANTI, LLP

(57) ABSTRACT

A process for obtaining water-based paints using expanded polystyrene (EPS) and/or extruded polystyrene (XPS) waste as raw material by a) cleaning the EPS and/or XPS waste with a surfactant to remove organic matter; b) rinse and remove all surfactants and solvents; c) treating the EPS and/or XPS waste with an organic solvent obtaining a mixture with a concentration of EPS and/or XPS of 20 and 80% w/w; d) decanting the impurities from the mixture obtained in step (c) for 24 hours to 120 hours; e) collecting the supernatant obtained from step (d); f) make a mixture of the supernatant obtained in step (e) with emulsifier and water; g) pigment dispersion in the mixture obtained in (f), for 5 to 50 minutes at 500 and 3.000 rpm and 20 and 90° C.; h) mix the product of step (g) with water until the desired concentration is achieved.

7 Claims, No Drawings

METHOD FOR OBTAINING WATER-BASED PAINTS USING EXPANDED POLYSTYRENE (EPS) WASTE AND/OR EXTRUDED POLYSTYRENE (XPS) WASTE AS RAW MATERIAL

CROSS REFERENCE TO RELATED APPLICATION

This Application is a 371 of PCT/CL2021/050031 filed on Apr. 23, 2021, which claims the benefit of U.S. Provisional Patent Application No. 63/014,305 filed on Apr. 23, 2020, the contents of each application are incorporated herein by reference.

FIELD OF THE INVENTION

The present invention is related to the paint industry to cover surfaces. The present invention discloses a process for manufacturing paints that mainly contain water as a solvent in their composition and using expanded polystyrene (EPS) and/or extruded polystyrene (XPS) household waste as raw material, a material also known as plumavit (Chile). From the present technology, it is creatively sought to convert a residue into a useful product, reduce the use of virgin raw materials derived from petroleum, with this technology the virgin resins that come from petroleum are replaced by the residue of EPS and/or XPS, and at the same time remedy major contamination problems.

STATE OF THE ART

Plumavit is a polymer derived from petroleum with numerous uses in the food, packaging, construction and other industries, due to its economic advantages, its low water absorption, innocuousness, inalterability and because it is inert. However, due to its fragility and large volume/mass ratio, it generates a significant amount of garbage that has caused concern from the authorities, the population, and complaints from environmentalists.

In Chile, at least 400 tons of industrial EPS waste are generated per year, an amount that is increased by at least 17.000 tons that originate in homes, of which at least half is XPS. This analysis is extrapolated to what happens worldwide, these materials are simply discarded if not for a treatment to recycle it as the one in the present invention. Today there are two options for its final disposal, one is to export it to countries like China, Argentina or Spain, where it is reused to obtain products such as photo frames or plastic materials such as school utensils (http://www.mastropor.com.ar/reciclado.html), and the other option is final disposal in landfills.

In the present patent application, both household EPS (expanded polystyrene) and/or XPS (extruded polystyrene) are used as raw material.

One of the differences between EPS and XPS (expanded polystyrene) is that the latter is used as a wrapper, container, or other for food.

From the state of the art, we can cite patent application CL 201700013 which discloses a process for obtaining paints using expanded polystyrene (EPS) waste as raw material. However, in said application, in the first step, the EPS waste is treated with an organic solvent until a mixture with a concentration of between 20 and 80% w/w is obtained. On the other hand, in the present application the objective is to generate a process to manufacture water-based paints from expanded polystyrene (EPS) waste, and it also solves the technique problem of the industrial EPS and electronics packaging, by also incorporating XPS used in food, which is generated as waste in much greater quantity globally.

Solution to the Technical Problem

The present patent application solves the problem of dealing with household and industrial expanded polystyrene (EPS) and extruded polystyrene (XPS) waste, along with reducing organic solvent emissions, by transforming it into a product that mostly contains water as a solvent, more specifically a water-based paint with non-obvious features such as its semi-gloss, impermeability to liquid water and permeability to water vapor. Paint is a material that is used on a variety of material surfaces such as concrete, internit, plaster-cardboard, oriented strand board (known as OSB board), wood, metal, among others, therefore, it is a necessary product at home and in the industry.

Additionally, it is known that EPS and XPS have the problem of having a large volume (volume/mass ratio), which implies high transportation costs and the use of large spaces in sanitary landfills, which also makes final disposal very expensive.

DESCRIPTION OF THE INVENTION

The present invention discloses a process to obtain water-based paints using waste expanded polystyrene (EPS) and/or extruded polystyrene (XPS) as raw material.

The present invention discloses a process for manufacturing water-based paints from waste expanded polystyrene (EPS) and/or extruded polystyrene (XPS), which comprises the following steps after obtaining the expanded and extruded polystyrene that has been discarded as waste:

a) Clean EPS and/or XPS waste with surfactant to remove organic matter.
b) Rinse and remove all surfactants and solvents used for cleaning.
c) Treat the EPS and/or XPS waste from step (b) with an organic solvent until obtaining a mixture with a concentration of EPS and/or XPS in the organic solvent of between 20 and 80% w/w;
d) Decant the impurities of the mixture obtained in step (c) for a period of time between 24 hours to 120 hours;
e) Collect the supernatant obtained from step (d);
f) Make a mixture of the supernatant obtained in step (e) with emulsifier and then water under certain conditions;
g) Carry out a pigment dispersion in the mixture obtained in (f), for 5 to 50 minutes at a speed between 500 and 3.000 rpm and at a temperature between 2° and 70° C.
h) Mix the product of step (g) with water, between 200 and 1.000 rpm, until the desired concentration is achieved.

The process of the present invention, as it is a process that uses expanded polystyrene and/or extruded polystyrene waste material as raw material, it is necessary to remove adhered solid particles, dust and organic matter, this is done in steps (a) and (d) in which organic matter is removed and decantation of the particles is carried out.

Among the organic solvents used in the present invention and without being limited to them we can mention propanone, 2-butanone, 2-pentanone, 3-pentanone, 2-hexanone, 3-hexanone, 2-heptanone, 3-heptanone, 4-heptanone, 2-octanone, 3-octanone, 4-octanone, 2-nonanone, 3-nonanone, 4-nonanone, 5-nonanone, 2-decanone, 3-decanone, 4-decanone, 5-decanone, 2-undecanone, 3-undecanone, 4-undecanone, 5-undecanone, 6-undecanone, 2,4-pentanedione, 2,4-hexanedione, 2,5-hexanedione, 2,4-heptanedione, 2,5-heptanedione, 2,6-heptanedione, 3,5-heptanedione, 3,6-heptanedione, methyl ethanoate, ethyl ethanoate, propyl ethanoate, isopropyl ethanoate, butyl ethanoate, isobutyl ethanoate, sec-butyl ethanoate, tert-butyl ethanoate, pentyl ethanoate, methylbutyl ethanoate, 2-methylbutyl ethanoate, 3-methylbutyl ethanoate, 1,2-dimethylpropyl ethanoate, 2-ethylpropyl ethanoate, hexyl ethanoate, methylpentyl ethanoate, 2-methylpentyl ethanoate, 3-methylpentyl ethanoate, 4-methylpentyl ethanoate, ethylbutyl ethanoate, ethanoate 2-ethylbutyl, 3-ethylbutyl ethanoate, methyl propanoate, ethyl propanoate, propyl propanoate, isopropyl propanoate, butyl propanoate, isobutyl propanoate, sec-butyl propanoate, tert-butyl propanoate, pentyl propanoate, methylbutyl propanoate, 2-methylbutyl propanoate, 3-methylbutyl propanoate, 1,2-dimethylpropyl propanoate, 2-ethylpropyl propanoate, hexyl propanoate, methylpentyl propanoate, 2-methylpentyl propanoate, 3-methylpentyl propanoate, 4-methylpentyl propanoate, ethylbutyl propanoate, 2-ethylbutyl propanoate, 3-ethylbutyl propanoate, pentane, 2-methylpentane, 3-methylpentane, hexane, 2-methylhexane, 3-methylhexane, heptane, 2-methylheptane, 3-methylheptane, 4-methylheptane, octane, 2-methyloctane, 3-methyloctane, 4-methyloctane, nonane, 2-methylnonane, 3-methylnonane, 4-methylnonane, 5-methylnonane, decane, 2-methyldecane, 3-methyldecane, 4-methyldecane, 5-methyldecane, 2-ethylpentane, 3-ethylpentane, 2-ethylhexane, 3-ethylhexane, 2-ethylheptane, 3-ethylheptane, 4-ethylheptane, 2-ethyloctane, 3-ethyloctane, 4-ethyloctane, 2-ethylnonane, 3-ethylnonane, 4-ethylnonane, 5-ethylnonane, 2-ethyldecane, 3-ethyldecane, 4-ethyldecane, 5-ethyldecane, benzene, toluene, xylene, trimethylbenzene, ethylbenzene, diethylbenzene, propylbenzene, dipropylbenzene, chloroform, dichloromethane, gasoline, kerosene, carbon tetrachloride, cyclohexene, cyclyl monoterpene, among others, and/or their mixtures.

More preferably, the organic solvent can be chosen from butyl ethyl ketone, acetone, xylene, butyl ethanoate, toluene, cyclohexene, cyclic monoterpene, among others, and also their mixtures.

The emulsifiers used in the present invention can be chosen from:

Fatty alcohol polyglycol ether, sodium di-isodecylsulfosuccinate, sodium alkylaryl polyglycol ether sulfate, sodium oleyl cetyl alcohol sulfate, phosphoric acid ester, ammonium alkyl polyglycol ether sulfate, sodium tetrapropylbenzylsulfonate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitan monoisostearate, sodium alkylaryl polyglycol ether sulfate, ammonium alkylaryl polyglycol ether sulfate, soy lecithin, tridecyl alcohol ethoxylate, among others.

In the present invention, the dispersing agent can be chosen from soybean lecithin, octadecen-1-ol ethoxylate, acrylic acid polymer in sodium salt, benzenesulfonic acid, C10-13-alkyl derivatives with triethanolamine, tetramethyldecynediol/nonylphenolethoxylate, oxide copolymer of ethylene and propylene, polyacrylic acid salt, sodium dodecylbenzenesulfonate, among others.

In the present invention, the pigment used can be chosen from; titanium dioxide, talc, calcium carbonate, carbon black, iron oxides, phthalocyanines, among others.

After the steps mentioned above, a paint product is obtained whose final composition has between 1 and 70% pigment, 70 and 1% EPS and/or XPS, between 0.01 and 15.0% emulsifier, 0.01 and 10.0% dispersant, and between 20 and 75% of a mixture of organic solvent water in a ratio between 4:1 and 2:3.

The paint obtained by the present invention has the feature of being impermeable to water and permeable to water vapour. That is, the product obtained by means of the present invention as shown with examples 1, 2, 3 and 4 show an improved result, from waste raw materials, which could not be derived from the information disclosed in prior art, since it is more innocuous with the environment. To measure the properties of impermeability to water and permeability to water vapor, known techniques were used according to the Karsten test and the NCh 2457.0F.2001 standard.

APPLICATION EXAMPLES

Example 1 a) 100 g of XPS and EPS waste were cleaned with commercial surfactants to remove household organic matter.
b) 96.2 g of XPS waste from step (a) was mixed with 133.8 g of xylene at 25° C.
c) The mixture from step (b) was left to stand for 48 h until decantation of the impurities was observed.
d) At least 52.6 g of the supernatant of the mixture resulting from step (c) were separated from impurities.
e) The 52.6 g of the supernatant from step (d) are mixed with 8 g of ammonium alkylarylpolyglycol ether sulfate emulsifier and 20 g of water at 500 rpm.
f) 25 g of pigment ($TiO_2$) and 18 g of $CaCO_3$ were dispersed in 40.3 g of the mixture from step (e), which was previously mixed with 2 g of dispersant. Dispersion was performed at 1.100 rpm for 15 min at 50° C.
g) After step (f) was completed, the resulting mixture was mixed with 14.7 g of water. Mixing was carried out at 500 rpm.

Example 2

In another embodiment of the present invention and only by way of example, polyoxyethylene sorbitan monooleate was used, using the following conditions.

a) 200 g of XPS waste were cleaned with commercial surfactants to remove organic matter.
b) 171.42 g of XPS waste from step (a) was mixed with 28.58 g of xylene at 25° C.
c) The mixture from step (b) was left to stand for 48 h until decantation of the impurities was observed.
d) At least 120 g of the supernatant of the mixture resulting from step (c) were separated from impurities.
e) The 120 g of the supernatant from step (d) are mixed with 20 g of polyoxyethylene sorbitan monooleate emulsifier and 20 g of water at 500 rpm.
f) 3 g of pigment ($TiO_2$) and 10 g of Talc were dispersed in 80 g of the mixture from step (e), which was previously mixed with 0.05 g of dispersant. Dispersion was performed at 3000 rpm for 45 min at 60° C.
g) After step (f) was completed, the resulting mixture was mixed with 6.95 g of water. Mixing was carried out at 800 rpm.

Example 3

In another embodiment of the present invention and only by way of example, polyoxyethylene sorbitan monooleate was used, using the following conditions.
  a) 60 g of EPS waste was cleaned with commercial surfactants to remove organic matter.
  b) 50 g of EPS waste from step (a) was mixed with 150 g of xylene at 25° C.
  c) The mixture from step (b) was left to stand for 48 h until decantation of the impurities was observed.
  d) At least 40 g of the supernatant of the mixture resulting from step (c) were separated from impurities.
  e) The 40 g of the supernatant from step (d) are mixed with 4 g of polyoxyethylene sorbitan monooleate emulsifier, and 18 g of water at 500 rpm.
  f) 30 g of pigment ($TiO_2$) and 30 g of Talc were dispersed in 31 g of the mixture from step (e), which was previously mixed with 7 g of dispersant. Dispersion was performed at 600 rpm for 25 min at 50° C.
  g) Once step (f) was finished, the resulting mixture was mixed with 2 g of water. Mixing was carried out at 500 rpm.

Example 4

In another embodiment of the present invention and only by way of example, ammonium alkylarylpolyglycol ether sulfate was used, using the following conditions.
  a) 30 g of XPS and EPS waste were cleaned with commercial surfactants to remove organic matter.
  b) 25.4 g of EPS waste from step (a) was mixed with 19.6 g of butyl ethanoate at 25° C.
  c) The mixture from step (b) was left to stand for 48 h until decantation of the impurities was observed.
  d) At least 22.5 g of the supernatant of the mixture resulting from step (c) were separated from impurities.
  e) The 22.5 g of the supernatant from step (d) are mixed with 1.8 g of ammonium alkylarylpolyglycol ether sulfate emulsifier and 18.05 g of water at 500 rpm.
  f) 8 g of $TiO_2$ pigment and 35 g of $CaCO_3$ were dispersed in 38.03 g of the mixture from step (e), which was previously mixed with 2 g of dispersant. Dispersion was performed at 600 rpm for 25 min at 50° C.
  g) Once step (f) was finished, the resulting mixture was mixed with 12.65 g of water. Mixing was carried out at 500 rpm.

Properties measured to the product obtained using the process of the present invention.

Water Impermeability

Tests were carried out to determine product features such as water impermeability and Permeability to water vapor.

A Karsten test tube was glued to the surface to be measured for impermeability, filled with water until the upper level of the water reaching a height of 10 ml. The amount of water that had to be added over time to maintain the column with 10 ml was measured.

The results obtained were the following:
Water absorption without paint applied=5 mL
Water absorption with paint applied=0.2 mL In other words, the paint obtained according to the process of the present invention reduces the permeability to water by 96%. (Karsten Tube test)

Water Vapor Permeability (Humidity)

The test (NCh 2457.0F.2001, wet method): Test tubes of the material (asbestos-cement plate) were assembled in a test plate containing liquid water (wet method). This assembly is placed in a test atmosphere with controlled temperature and humidity. Due to the difference between the different partial pressures of water vapor in the test assembly and in the chamber, a flow of water vapor passes through the test tubes. The assembly is periodically weighed in order to determine the water vapor transmission coefficient when the steady state is reached.

The results obtained were the following:
Water vapor permeability without paint applied=3.8365 g/(m²·h)
Water vapor permeability with paint applied=2.6705 g/(m²·h)

In other words, the paint obtained according to the process of the present invention allows permeability to water vapor by 69.6%.

The invention claimed is:

1. A process for obtaining water-based paints using waste expanded polystyrene (EPS) and/or extruded polystyrene (XPS) as raw material, comprising:
  a) cleaning EPS and/or XPS waste with a surfactant to remove organic matter;
  b) rinsing and removing all surfactants and solvents used for cleaning;
  c) treat the EPS and/or XPS waste from step (b) with an organic solvent until obtaining a first mixture with a concentration of EPS and/or XPS in the organic solvent of between 20 and 80% w/w;
  d) decanting impurities from the mixture obtained in step (c) for a period of time between 24 hours to 120 hours;
  e) collecting a supernatant obtained from step (d);
  f) making a second mixture of the supernatant obtained in step (e) with emulsifier and then water;
  g) carrying out a pigment dispersion in the second mixture obtained in (f), for 5 to 50 minutes at a speed between 500 and 3,000 rpm and at a temperature between 2° and 90° C.;
  h) mixing the product of step (g) with water, between 200 and 2,000 rpm, until achieving a mixture of organic solvent water in a ratio between 4:1 and 2:3.

2. The process according to claim 1, wherein the organic solvents are selected from the group consisting of propanone, 2-butanone, 2-pentanone, 3-pentanone, 2-hexanone, 3-hexanone, 2-heptanone, 3-heptanone, 4-heptanone, 2-octanone, 3-octanone, 4-octanone, 2-nonanone, 3-nonanone, 4-nonanone, 5-nonanone, 2-decanone, 3-decanone, 4-decanone, 5-decanone, 2-undecanone, 3-undecanone, 4-undecanone, 5-undecanone, 6-undecanone, 2,4-pentanedione, 2,4-hexanedione, 2,5-hexanedione, 2,4-heptanedione, 2,5-heptanedione, 2,6-heptanedione, 3,5-heptanedione, 3,6-heptanedione, methyl ethanoate, ethyl ethanoate, propyl ethanoate, isopropyl ethanoate, butyl ethanoate, isobutyl ethanoate, sec-butyl ethanoate, tert-butyl ethanoate, pentyl ethanoate, methylbutyl ethanoate, 2-methylbutyl ethanoate, 3-methylbutyl ethanoate, 1,2-dimethylpropyl ethanoate, 2-ethylpropyl ethanoate, hexyl ethanoate, methylpentyl ethanoate, 2-methylpentyl ethanoate, 3-methylpentyl ethanoate, 4-methylpentyl ethanoate, ethylbutyl ethanoate, ethanoate 2-ethylbutyl, 3-ethylbutyl ethanoate, methyl propanoate, ethyl propanoate, propyl propanoate, isopropyl propanoate, butyl propanoate, isobutyl propanoate, sec-butyl propanoate, tert-butyl propanoate, pentyl propanoate, methylbutyl propanoate, 2-methylbutyl propanoate, 3-methylbutyl propanoate, 1,2-dimethylpropyl propanoate, 2-ethylpropyl propanoate, hexyl propanoate, methylpentyl propanoate, 2-methylpentyl propanoate, 3-methylpentyl propanoate, 4-methylpentyl propanoate, ethylbutyl propanoate, 2-ethylbutyl propanoate, 3-ethylbutyl propanoate, pentane, 2-methylpentane, 3-methylpentane, hexane, 2-methylhexane, 3-methylhexane, heptane, 2-methylheptane, 3-methylheptane, 4-methylheptane, octane, 2-methyloctane, 3-methyloctane, 4-methyloctane, nonane, 2-methylnonane, 3-methylnonane, 4-methylnonane, 5-methylnonane, decane, 2-methyldecane, 3-methyldecane, 4-methyldecane, 5-methyldecane, 2-ethylpentane, 3-ethylpentane, 2-ethylhexane, 3-ethylhexane, 2-ethylheptane, 3-ethylheptane, 4-ethylheptane, 2-ethyloctane, 3-ethyloctane, 4-ethyloctane, 2-ethylnonane, 3-ethylnonane, 4-ethylnonane, 5-ethylnonane, 2-ethyldecane, 3-ethyldecane, 4-ethyldecane, 5-ethyldecane, benzene, toluene, xylene, trimethylbenzene, ethylbenzene, diethylbenzene, propylbenzene, dipropylbenzene, chloroform, dichloromethane, gasoline, kerosene, carbon tetrachloride, cyclohexene, cyclyl monoterpene, and mixtures thereof.

3. The process according to claim 2, wherein the organic solvent is selected from the group consisting of butyl ethyl ketone, acetone, xylene, butyl ethanoate, toluene, cyclohexene, cyclic monoterpene, and mixtures thereof.

4. The process according to claim 1, wherein the emulsifiers are selected from the group consisting of fatty alcohol polyglycol ether, sodium di-isodecyl sulfosuccinate, sodium alkylaryl polyglycol ether sulfate, sodium oleyl acetyl alcohol sulfate, phosphoric acid ester, alkyl polyglycol ether sulfate, sodium tetrapropylbenzylsulfonate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitan monoisostearate, sodium alkylaryl polyglycol ether sulfate, ammonium alkylaryl polyglycol ether sulfate, soy lecithin, and tridecyl alcohol ethoxylate.

5. The process according to claim 1, wherein the dispersing agent is selected from the group consisting of soybean lecithin, octadecen-1-ol ethoxylate, acrylic acid polymer in sodium salt, benzenesulfonic acid, C10-13-alkyl derivatives with triethanolamine, tetramethyldecynediol/nonylphenolethoxylate, oxide copolymer of ethylene and propylene, polyacrylic acid salt, and sodium dodecylbenzenesulfonate.

6. The process according to claim 1, wherein the pigment is selected from the group consisting of titanium dioxide, talc, calcium carbonate, carbon black, iron oxides, and phthalocyanines.

7. A water-based paint obtained by the process of claim 1, comprising between 1 and 70% pigment, 70 and 1% EPS and/or XPS, between 0.01 and 15.0% emulsifier, 0.01 and 10.0% dispersant, and between 20 and 75% of a mixture of organic solvent water in a ratio between 4:1 and 2:3.

* * * * *